May 3, 1938.　　　　P. BURKE　　　　2,115,763
CLUTCH
Filed March 17, 1937
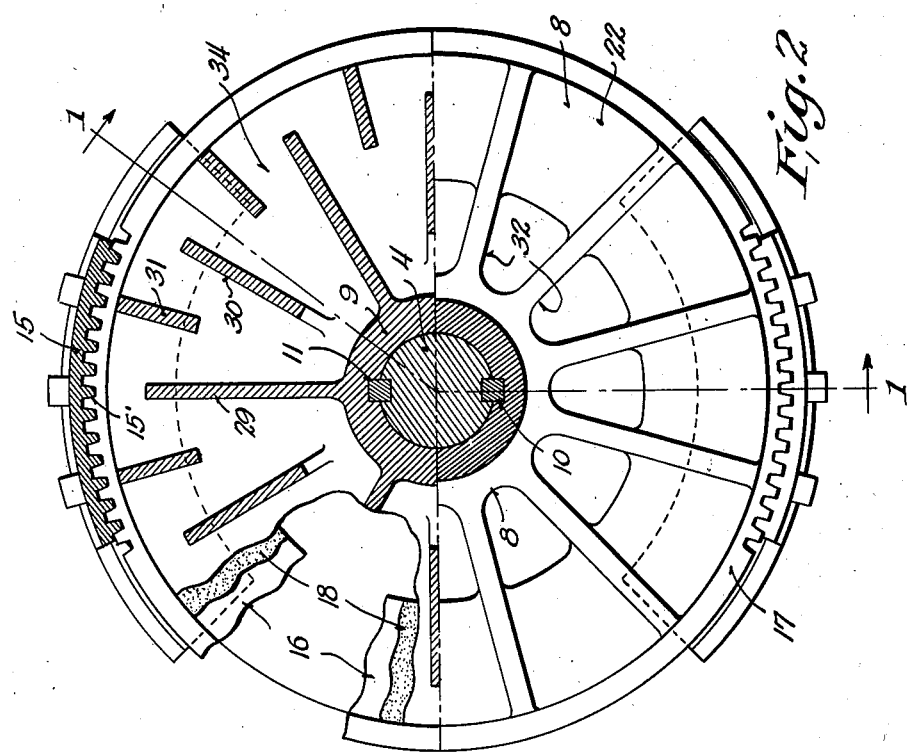
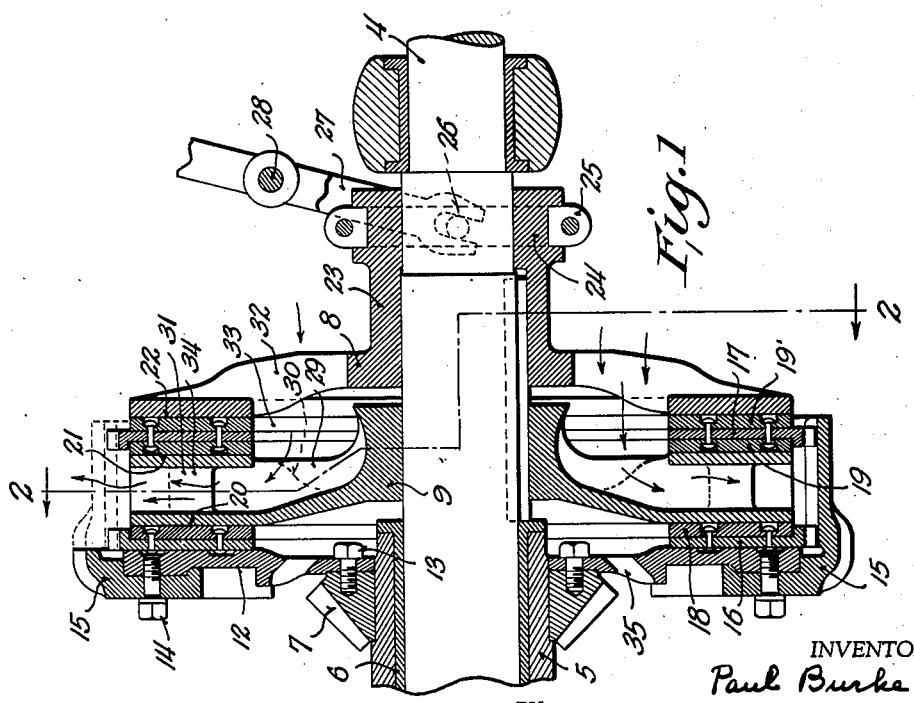
INVENTOR.
Paul Burke
BY Louis O. French
ATTORNEY.

Patented May 3, 1938

2,115,763

UNITED STATES PATENT OFFICE 2,115,763

CLUTCH

Paul Burke, Green Bay, Wis., assignor to Northwest Engineering Corporation, Green Bay, Wis., a corporation of Wisconsin Application March 17, 1937, Serial No. 131,320

2 Claims. (Cl. 192—113)

The invention relates to friction clutches of the multiple friction disk type.

Where clutches of the above type are used to transmit large amounts of driving torque when the engagement of the clutch elements takes place with slip as when a large inertial mass must be brought up from rest to speed, a considerable amount of slippage of the clutch elements under relatively high torque will be required. This type of operation liberates considerable energy at the friction surfaces in the form of heat. The object of the present invention is to provide a clutch construction in which this liberated heat will be readily dissipated by the clutch structure itself. More particularly according to the present invention, the clutch has a plurality of friction surfaces between one pair of which is provided a space having access openings near the smaller diameter and egress openings at the larger diameter so that air may circulate through the space and rapidly cool these surfaces. Furthermore, this space is preferably provided with ribs more or less radially disposed to act as fan or blower vanes to induce the rapid flow of air through said space.

The invention further consists in the several features hereinafter set forth and more particularly defined by claims at the conclusion hereof.

In the drawing:

Fig. 1 is a vertical sectional view through a clutch embodying the invention taken on the broken line 1—1 of Fig. 2;

Fig. 2 is a vertical sectional view of the clutch taken on the broken line 2—2 of Fig. 1.

Referring to the drawing, the numeral 4 designates a drive or power shaft, and 5 a driven shaft loosely and rotatably mounted on a bearing 6 on the drive shaft and carrying a pinion 7 for connection with another part to be driven.

The clutch includes a driving member which in the present instance is made in two parts 8 and 9 whose hubs are slidably keyed at 10 and 11 to the shaft 4.

The driven member 12 of the clutch is an annular plate secured by bolts 13 to the pinion 7 and secured at diametrically spaced portions by bolts 14 to segmental extensions 15 which subtend only a portion of the total circumference. These extensions 15 are provided with internal teeth 15' which engage corresponding external teeth formed as a part of driven disks 16 and 17. Disk 16 has riveted to it an annular disk 18 of frictional material and disk 17 has similar disks 19 and 19' of frictional material riveted to both sides of it.

The driving part 9 has two disk-like smoothly finished surfaces 20 and 21 formed upon it, and the part 8 has a similar disk-like surface 22 formed on it. The surface 20 abuts the disk 18, and the surface 21 abuts the disk 19 of the disk 17 while the surface 22 abuts the disk 19'. Thus the surfaces 20, 21, and 22 of the driving members 9 and 8 are adapted to have frictional engagement with the disks 18, 19, and 19' respectively, and this engagement is produced by forcibly moving the driving part 8 toward the left as viewed in Fig. 1 which brings it into abutting engagement with the disk 17 and then moves this disk into abutting engagement with the part 9 which is then moved into engagement with the disk 16 so that the driving and driven parts of the clutch are then connected together through the frictional engagement of the disks. For effecting this engagement the hub 23 of the part 8 is provided with an annular groove 24 in which a collar 25 is loosely mounted, said collar having pins 26 for connection to the forked ends of a shift lever 27 pivoted at 28 and operated through any suitable connections by the operator. When the part 9 is moved toward the right to a release position, then the part 9 moves freely between the adjacent disk elements.

With clutches of this kind when the engagement of the clutch elements takes place with slip as when a large inertial mass must be brought up from rest to speed, a considerable amount of slippage of the clutch elements under relatively high torque will be required. This type of operation liberates considerable energy at the friction surfaces in the form of heat, and to promote long life and efficient operation of the clutch this heat should be dissipated. The present invention is particularly directed to the construction and the arrangement of the clutch elements so that the frictional heat will be carried away.

The heat of frictional engagement of friction surface 22 with the disk 19' is readily conveyed to the atmosphere through the metallic surfaces of the part 8 which has a considerable area of exposed surface.

The surfaces 20 and 21 of the part 9 being internally disposed are slow to give up their heat in the usual constructions, but with the present arrangement these surfaces are spaced apart or separated from each other and connected together by ribs formed integrally with the metal of these surfaces and here shown as having the various forms 29, 30, and 31, there being a certain number of spaced ribs 29 extending from the hub of part 9 toward the rim, and the ribs 30 interposed between the ribs 29 and extending through the intermediate area of the part 9 and the short ribs 31 interposed between the ribs 30 and 29 adjacent their upper ends and extending to the rim of the part 9. These ribs are shown as straight radially disposed portions, but they may be curved or otherwise formed to provide blades which act like a blower or fan. These ribs, when the clutch is rotating, operate to impart a vigorous outwardly radial movement of the air in the cylindrical space between the surfaces 20 and 21, and this increased velocity of air intensifies the cooling immensely.

The outer driving part 8 has the large air inlet openings 32 formed in it so that air may pass therethrough to an annular space 33 which is kept free and open so that the air may readily pass therethrough into the space 34 between the surfaces 20 and 21, the arrows showing the course of the air. The driving extensions 15 are made, as previously described, to subtend only a fraction of the total circumferential surface so that the whole circumference intermediate the ends of these extensions is kept completely free for the egress of air.

The driven member 12 is also provided with a series of openings 35 which permit the circulation of air in the space adjacent the member 9.

I desire it to be understood that this invention is not to be limited to any particular form or arrangement of parts except as such limitations are included in the claims.

What I claim as my invention is:

1. In a clutch, the combination of a driving shaft, a driven clutch element having spaced friction disks, an annular driving clutch element mounted on said shaft and having surfaces engageable with said friction disks and spaces between said surfaces with an air inlet at its smaller diameter and air outlets at its larger diameter, said spaces being formed by a series of radially disposed ribs extending different distances from its inner and outer diameters to form impeller vanes to induce a flow of cooling air through said spaces.

2. In a clutch, the combination of a driving shaft, a driven clutch element having spaced friction disks, an annular driving clutch element slidably mounted on said shaft and having surfaces engageable with said friction disks, a second annular driving element mounted on said shaft and having an air-exposed surface engageable with one of said friction disks and having an air inlet adjacent said shaft, said first named driving clutch element having passages between said surfaces communicating at their inner ends with said air inlet and open at its outer diameter for egress of air, the friction disk with which the surfaces of both of said driving elements engage providing a free passage of air from said inlet to said annular space.

PAUL BURKE.